United States Patent
Martinez et al.

(10) Patent No.: US 8,386,506 B2
(45) Date of Patent: Feb. 26, 2013

(54) SYSTEM AND METHOD FOR CONTEXT ENHANCED MESSAGING

(75) Inventors: Ronald Martinez, San Francisco, CA (US); Marc Eliot Davis, San Francisco, CA (US); Michael Spiegelman, Los Angeles, CA (US); Christopher T Paretti, San Francisco, CA (US); Nicola Stefano Ghezzi, Santa Monica, CA (US); Christopher William Higgins, Portland, OR (US); Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 561 days.

(21) Appl. No.: 12/195,969

(22) Filed: Aug. 21, 2008

(65) Prior Publication Data

US 2010/0049702 A1 Feb. 25, 2010

(51) Int. Cl.
G06F 17/30 (2006.01)
(52) U.S. Cl. ........................................................ 707/759
(58) Field of Classification Search ................ 705/14.49; 707/759
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

U.S. Appl. No. 12/409,867, filed Mar. 24, 2009, King.

(Continued)

*Primary Examiner* — Amresh Singh
(74) *Attorney, Agent, or Firm* — James J. DeCarlo; Greenberg Traurig, LLP

(57) ABSTRACT

A system and method for media enhanced messaging. A message from a message sender to be delivered to at least one message recipient is received over a network. The message comprises at least one delivery criteria and at least one content criteria. When it is determined, via the network that the delivery criteria of the message has been satisfied, a query is formulated based on the content criteria so as to search, via the network, for user profile data, social network data, spatial data, temporal data and topical data that is available via the network and relates to the content criteria and to media files so as to identify at least one media file that is relevant to the content criteria. The media files are inserted into the message and the message is transmitted over the network to the recipient.

49 Claims, 10 Drawing Sheets

U.S. PATENT DOCUMENTS

| | | | |
|---|---|---|---|
| 6,021,403 | A | 2/2000 | Horvitz et al. |
| 6,047,234 | A | 4/2000 | Cherveny et al. |
| 6,098,065 | A | 8/2000 | Skillen et al. |
| 6,112,181 | A | 8/2000 | Shear et al. |
| 6,157,924 | A | 12/2000 | Austin |
| 6,169,992 | B1 | 1/2001 | Beall et al. |
| 6,212,552 | B1 | 4/2001 | Biliris et al. |
| 6,266,667 | B1 | 7/2001 | Olsson |
| 6,314,365 | B1 | 11/2001 | Smith |
| 6,314,399 | B1 | 11/2001 | Deligne et al. |
| 6,324,519 | B1 | 11/2001 | Eldering |
| 6,327,590 | B1 | 12/2001 | Chidlovskii et al. |
| 6,446,065 | B1 | 9/2002 | Nishioka et al. |
| 6,490,698 | B1 | 12/2002 | Horvitz et al. |
| 6,502,033 | B1 | 12/2002 | Phuyal |
| 6,523,172 | B1 | 2/2003 | Martinez-Guerra et al. |
| 6,571,279 | B1 | 5/2003 | Herz et al. |
| 6,601,012 | B1 | 7/2003 | Horvitz et al. |
| 6,662,195 | B1 | 12/2003 | Langseth et al. |
| 6,665,640 | B1 | 12/2003 | Bennett et al. |
| 6,694,316 | B1 | 2/2004 | Langseth et al. |
| 6,701,311 | B2 | 3/2004 | Biebesheimer et al. |
| 6,701,315 | B1 | 3/2004 | Austin |
| 6,708,203 | B1 | 3/2004 | Makar et al. |
| 6,731,940 | B1 | 5/2004 | Nagendran |
| 6,741,980 | B1 | 5/2004 | Langseth et al. |
| 6,757,661 | B1 | 6/2004 | Blaser et al. |
| 6,773,344 | B1 | 8/2004 | Gabai et al. |
| 6,781,920 | B2 | 8/2004 | Bates et al. |
| 6,785,670 | B1 | 8/2004 | Chiang et al. |
| 6,789,073 | B1 | 9/2004 | Lunenfeld |
| 6,813,501 | B2 | 11/2004 | Kinnunen et al. |
| 6,816,850 | B2 | 11/2004 | Culliss |
| 6,829,333 | B1 | 12/2004 | Frazier |
| 6,834,195 | B2 | 12/2004 | Brandenberg et al. |
| 6,842,761 | B2 | 1/2005 | Diamond et al. |
| 6,845,370 | B2 | 1/2005 | Burkey et al. |
| 6,850,252 | B1 | 2/2005 | Hoffberg |
| 6,853,913 | B2 | 2/2005 | Cherveny et al. |
| 6,853,982 | B2 | 2/2005 | Smith et al. |
| 6,882,977 | B1 | 4/2005 | Miller |
| 6,904,160 | B2 | 6/2005 | Burgess |
| 6,931,254 | B1 | 8/2005 | Egner et al. |
| 6,961,660 | B2 | 11/2005 | Underbrink et al. |
| 6,961,731 | B2 | 11/2005 | Holbrook |
| 6,985,839 | B1 | 1/2006 | Motamedi et al. |
| 7,010,492 | B1 | 3/2006 | Bassett et al. |
| 7,027,801 | B1 | 4/2006 | Hall et al. |
| 7,058,508 | B2 | 6/2006 | Combs et al. |
| 7,058,626 | B1 | 6/2006 | Pan et al. |
| 7,062,510 | B1 | 6/2006 | Eldering |
| 7,065,345 | B2 | 6/2006 | Carlton et al. |
| 7,065,483 | B2 | 6/2006 | Decary et al. |
| 7,069,308 | B2 | 6/2006 | Abrams |
| 7,073,129 | B1 | 7/2006 | Robarts et al. |
| 7,110,776 | B2 | 9/2006 | Sambin |
| 7,143,091 | B2 | 11/2006 | Charnock et al. |
| 7,149,696 | B2 | 12/2006 | Shimizu et al. |
| 7,181,438 | B1 | 2/2007 | Szabo |
| 7,185,286 | B2 | 2/2007 | Zondervan |
| 7,194,512 | B1 | 3/2007 | Creemer et al. |
| 7,203,597 | B2 | 4/2007 | Sato et al. |
| 7,209,915 | B1 | 4/2007 | Taboada et al. |
| 7,219,013 | B1 | 5/2007 | Young et al. |
| 7,236,969 | B1 | 6/2007 | Skillen et al. |
| 7,254,581 | B2 | 8/2007 | Johnson et al. |
| 7,257,570 | B2 | 8/2007 | Riise et al. |
| 7,305,445 | B2 | 12/2007 | Singh et al. |
| 7,320,025 | B1 | 1/2008 | Steinberg et al. |
| 7,343,364 | B2 | 3/2008 | Bram et al. |
| 7,395,507 | B2 | 7/2008 | Robarts et al. |
| 7,404,084 | B2 | 7/2008 | Fransdonk |
| 7,437,312 | B2 | 10/2008 | Bhatia et al. |
| 7,451,102 | B2 | 11/2008 | Nowak |
| 7,461,168 | B1 | 12/2008 | Wan |
| 7,496,548 | B1 | 2/2009 | Ershov |
| 7,522,995 | B2 | 4/2009 | Nortrup |
| 7,529,811 | B2 | 5/2009 | Thompson |
| 7,562,122 | B2 | 7/2009 | Oliver et al. |
| 7,577,665 | B2 | 8/2009 | Ramer et al. |
| 7,584,215 | B2 | 9/2009 | Saari et al. |
| 7,624,104 | B2 | 11/2009 | Berkhin et al. |
| 7,624,146 | B1 | 11/2009 | Brogne et al. |
| 7,634,465 | B2 | 12/2009 | Sareen et al. |
| 7,657,907 | B2 | 2/2010 | Fennan et al. |
| 7,681,147 | B2 | 3/2010 | Richardson-Bunbury et al. |
| 7,725,492 | B2 | 5/2010 | Sittig et al. |
| 7,729,901 | B2 | 6/2010 | Richardson-Bunbury et al. |
| 7,769,740 | B2 | 8/2010 | Martinez et al. |
| 7,769,745 | B2 | 8/2010 | Naaman |
| 7,783,622 | B1 | 8/2010 | Vandermolen et al. |
| 7,792,040 | B2 | 9/2010 | Nair |
| 7,802,724 | B1 | 9/2010 | Nohr |
| 7,822,871 | B2 | 10/2010 | Stolorz et al. |
| 7,831,586 | B2 | 11/2010 | Reitter et al. |
| 7,865,308 | B2 | 1/2011 | Athsani |
| 7,925,708 | B2 | 4/2011 | Davis |
| 2001/0013009 | A1 | 8/2001 | Greening et al. |
| 2001/0035880 | A1 | 11/2001 | Musatov et al. |
| 2001/0047384 | A1 | 11/2001 | Croy |
| 2001/0052058 | A1 | 12/2001 | Ohran |
| 2002/0014742 | A1 | 2/2002 | Conte et al. |
| 2002/0019849 | A1 | 2/2002 | Tuvey et al. |
| 2002/0019857 | A1 | 2/2002 | Harjanto |
| 2002/0023091 | A1 | 2/2002 | Silberberg et al. |
| 2002/0023230 | A1 | 2/2002 | Bolnick et al. |
| 2002/0035605 | A1 | 3/2002 | McDowell et al. |
| 2002/0049968 | A1 | 4/2002 | Wilson et al. |
| 2002/0052786 | A1 | 5/2002 | Kim et al. |
| 2002/0052875 | A1 | 5/2002 | Smith et al. |
| 2002/0054089 | A1 | 5/2002 | Nicholas |
| 2002/0065844 | A1 | 5/2002 | Robinson et al. |
| 2002/0069218 | A1 | 6/2002 | Sull et al. |
| 2002/0099695 | A1 | 7/2002 | Abajian et al. |
| 2002/0103870 | A1 | 8/2002 | Shouji |
| 2002/0111956 | A1 | 8/2002 | Yeo et al. |
| 2002/0112035 | A1 | 8/2002 | Carey |
| 2002/0133400 | A1 | 9/2002 | Terry et al. |
| 2002/0138331 | A1 | 9/2002 | Hosea et al. |
| 2002/0152267 | A1 | 10/2002 | Lennon |
| 2002/0169840 | A1 | 11/2002 | Sheldon et al. |
| 2002/0173971 | A1 | 11/2002 | Stirpe et al. |
| 2002/0178161 | A1 | 11/2002 | Brezin et al. |
| 2002/0198786 | A1 | 12/2002 | Tripp et al. |
| 2003/0008661 | A1 | 1/2003 | Joyce et al. |
| 2003/0009367 | A1 | 1/2003 | Morrison |
| 2003/0009495 | A1 | 1/2003 | Adjaoute |
| 2003/0027558 | A1 | 2/2003 | Eisinger |
| 2003/0032409 | A1 | 2/2003 | Hutcheson et al. |
| 2003/0033331 | A1 | 2/2003 | Sena et al. |
| 2003/0033394 | A1 | 2/2003 | Stine et al. |
| 2003/0065762 | A1 | 4/2003 | Stolorz et al. |
| 2003/0069877 | A1 | 4/2003 | Grefenstette et al. |
| 2003/0069880 | A1 | 4/2003 | Harrison et al. |
| 2003/0078978 | A1 | 4/2003 | Lardin et al. |
| 2003/0080992 | A1 | 5/2003 | Haines |
| 2003/0088687 | A1 | 5/2003 | Begeja et al. |
| 2003/0126250 | A1 | 7/2003 | Jhanji |
| 2003/0149574 | A1 | 8/2003 | Rudman |
| 2003/0154293 | A1 | 8/2003 | Zmolek |
| 2003/0165241 | A1 | 9/2003 | Fransdonk |
| 2003/0191816 | A1 | 10/2003 | Landress et al. |
| 2004/0010492 | A1 | 1/2004 | Zhao et al. |
| 2004/0015588 | A1 | 1/2004 | Cotte |
| 2004/0030798 | A1 | 2/2004 | Andersson et al. |
| 2004/0034752 | A1 | 2/2004 | Ohran |
| 2004/0043758 | A1 | 3/2004 | Sorvari et al. |
| 2004/0044736 | A1 | 3/2004 | Austin-Lane et al. |
| 2004/0070602 | A1 | 4/2004 | Kobuya et al. |
| 2004/0139025 | A1 | 7/2004 | Coleman |
| 2004/0139047 | A1 | 7/2004 | Rechsteiner |
| 2004/0148341 | A1 | 7/2004 | Cotte |
| 2004/0152477 | A1 | 8/2004 | Wu et al. |
| 2004/0183829 | A1 | 9/2004 | Kontny et al. |
| 2004/0201683 | A1 | 10/2004 | Murashita et al. |
| 2004/0203851 | A1 | 10/2004 | Vetro et al. |
| 2004/0203909 | A1 | 10/2004 | Koster |

| | | | | | | |
|---|---|---|---|---|---|---|
| 2004/0209602 A1 | 10/2004 | Joyce et al. | | 2007/0067267 A1 | 3/2007 | Ives |
| 2004/0243623 A1 | 12/2004 | Ozer et al. | | 2007/0072591 A1 | 3/2007 | McGary et al. |
| 2004/0260804 A1 | 12/2004 | Grabarnik et al. | | 2007/0073583 A1 | 3/2007 | Grouf et al. |
| 2004/0267880 A1 | 12/2004 | Patiejunas | | 2007/0073641 A1 | 3/2007 | Perry et al. |
| 2005/0005242 A1 | 1/2005 | Hoyle | | 2007/0086061 A1 | 4/2007 | Robbins |
| 2005/0015451 A1 | 1/2005 | Sheldon et al. | | 2007/0087756 A1 | 4/2007 | Hoffberg |
| 2005/0015599 A1 | 1/2005 | Wang et al. | | 2007/0088852 A1 | 4/2007 | Levkovitz |
| 2005/0050027 A1 | 3/2005 | Yeh | | 2007/0100956 A1 | 5/2007 | Kumar |
| 2005/0050043 A1 | 3/2005 | Pyhalammi et al. | | 2007/0112762 A1 | 5/2007 | Brubaker |
| 2005/0055321 A1 | 3/2005 | Fratkina | | 2007/0118661 A1 | 5/2007 | Vishwanathan et al. |
| 2005/0060381 A1 | 3/2005 | Huynh et al. | | 2007/0121843 A1 | 5/2007 | Atazky et al. |
| 2005/0065950 A1 | 3/2005 | Chaganti et al. | | 2007/0130137 A1 | 6/2007 | Oliver et al. |
| 2005/0065980 A1 | 3/2005 | Hyatt et al. | | 2007/0136048 A1 | 6/2007 | Richardson-Bunbury et al. |
| 2005/0076060 A1 | 4/2005 | Finn et al. | | 2007/0136235 A1 | 6/2007 | Hess |
| 2005/0086187 A1 | 4/2005 | Grosser et al. | | 2007/0136256 A1 | 6/2007 | Kapur et al. |
| 2005/0105552 A1 | 5/2005 | Osterling | | 2007/0136689 A1 | 6/2007 | Richardson-Bunbury et al. |
| 2005/0108213 A1 | 5/2005 | Riise et al. | | 2007/0143345 A1 | 6/2007 | Jones et al. |
| 2005/0120006 A1 | 6/2005 | Nye | | 2007/0150168 A1 | 6/2007 | Balcom et al. |
| 2005/0131727 A1 | 6/2005 | Sezan et al. | | 2007/0150359 A1 | 6/2007 | Lim et al. |
| 2005/0149397 A1 | 7/2005 | Morgenstern et al. | | 2007/0155411 A1 | 7/2007 | Morrison |
| 2005/0151849 A1 | 7/2005 | Fitzhugh et al. | | 2007/0161382 A1 | 7/2007 | Melinger et al. |
| 2005/0159220 A1 | 7/2005 | Wilson et al. | | 2007/0162850 A1 | 7/2007 | Adler |
| 2005/0159970 A1 | 7/2005 | Buyukkokten et al. | | 2007/0168430 A1 | 7/2007 | Brun et al. |
| 2005/0160080 A1 | 7/2005 | Dawson | | 2007/0173266 A1 | 7/2007 | Barnes |
| 2005/0165699 A1 | 7/2005 | Hahn-Carlson | | 2007/0179792 A1* | 8/2007 | Kramer ............................. 705/1 |
| 2005/0166240 A1 | 7/2005 | Kim | | 2007/0185599 A1 | 8/2007 | Robinson et al. |
| 2005/0171955 A1 | 8/2005 | Hull et al. | | 2007/0192299 A1 | 8/2007 | Zuckerberg et al. |
| 2005/0177385 A1 | 8/2005 | Hull et al. | | 2007/0198506 A1 | 8/2007 | Attaran Rezaei et al. |
| 2005/0182824 A1 | 8/2005 | Cotte | | 2007/0198563 A1 | 8/2007 | Apparao et al. |
| 2005/0183110 A1 | 8/2005 | Anderson | | 2007/0203591 A1 | 8/2007 | Bowerman |
| 2005/0187786 A1 | 8/2005 | Tsai | | 2007/0219708 A1 | 9/2007 | Brasche et al. |
| 2005/0192025 A1 | 9/2005 | Kaplan | | 2007/0233585 A1 | 10/2007 | Ben Simon et al. |
| 2005/0203801 A1 | 9/2005 | Morgenstern et al. | | 2007/0239348 A1 | 10/2007 | Cheung |
| 2005/0216295 A1 | 9/2005 | Abrahamsohn | | 2007/0239517 A1 | 10/2007 | Chung et al. |
| 2005/0216300 A1 | 9/2005 | Appelman et al. | | 2007/0259653 A1 | 11/2007 | Tang et al. |
| 2005/0219375 A1 | 10/2005 | Hasegawa et al. | | 2007/0260508 A1 | 11/2007 | Barry et al. |
| 2005/0234781 A1 | 10/2005 | Morgenstern | | 2007/0260604 A1 | 11/2007 | Haeuser et al. |
| 2005/0273510 A1 | 12/2005 | Schuh | | 2007/0271297 A1 | 11/2007 | Jaffe et al. |
| 2006/0020631 A1 | 1/2006 | Cheong Wan et al. | | 2007/0271340 A1 | 11/2007 | Goodman et al. |
| 2006/0026013 A1 | 2/2006 | Kraft | | 2007/0273758 A1 | 11/2007 | Mendoza et al. |
| 2006/0026067 A1 | 2/2006 | Nicholas et al. | | 2007/0276940 A1 | 11/2007 | Abraham et al. |
| 2006/0031108 A1 | 2/2006 | Oran | | 2007/0282621 A1 | 12/2007 | Altman et al. |
| 2006/0040719 A1 | 2/2006 | Plimi | | 2007/0282675 A1 | 12/2007 | Varghese |
| 2006/0047563 A1 | 3/2006 | Wardell | | 2007/0288278 A1 | 12/2007 | Alexander et al. |
| 2006/0047615 A1 | 3/2006 | Ravin | | 2008/0005313 A1 | 1/2008 | Flake et al. |
| 2006/0053058 A1 | 3/2006 | Hotchkiss et al. | | 2008/0005651 A1 | 1/2008 | Grefenstette et al. |
| 2006/0069612 A1 | 3/2006 | Hurt et al. | | 2008/0010206 A1 | 1/2008 | Coleman |
| 2006/0069616 A1 | 3/2006 | Bau | | 2008/0021957 A1 | 1/2008 | Medved et al. |
| 2006/0069749 A1 | 3/2006 | Herz et al. | | 2008/0026804 A1 | 1/2008 | Baray et al. |
| 2006/0074853 A1 | 4/2006 | Liu et al. | | 2008/0028031 A1 | 1/2008 | Bailey et al. |
| 2006/0085392 A1 | 4/2006 | Wang et al. | | 2008/0040283 A1 | 2/2008 | Morris |
| 2006/0085419 A1 | 4/2006 | Rosen | | 2008/0046298 A1 | 2/2008 | Ben-Yehuda et al. |
| 2006/0089876 A1 | 4/2006 | Boys | | 2008/0070588 A1 | 3/2008 | Morin |
| 2006/0116924 A1 | 6/2006 | Angeles et al. | | 2008/0086356 A1 | 4/2008 | Glassman et al. |
| 2006/0123053 A1 | 6/2006 | Scannell, Jr. | | 2008/0086431 A1 | 4/2008 | Robinson et al. |
| 2006/0129313 A1 | 6/2006 | Becker | | 2008/0091796 A1 | 4/2008 | Story et al. |
| 2006/0129605 A1 | 6/2006 | Doshi | | 2008/0096664 A1 | 4/2008 | Baray et al. |
| 2006/0143236 A1* | 6/2006 | Wu ............................. 707/104.1 | | 2008/0102911 A1 | 5/2008 | Campbell et al. |
| 2006/0161894 A1 | 7/2006 | Oustiougov et al. | | 2008/0104061 A1 | 5/2008 | Rezaei |
| 2006/0168591 A1 | 7/2006 | Hunsinger et al. | | 2008/0104227 A1 | 5/2008 | Birnie et al. |
| 2006/0173838 A1 | 8/2006 | Garg et al. | | 2008/0109761 A1 | 5/2008 | Stambaugh |
| 2006/0173985 A1 | 8/2006 | Moore | | 2008/0109843 A1 | 5/2008 | Ullah |
| 2006/0178822 A1 | 8/2006 | Lee | | 2008/0114751 A1 | 5/2008 | Cramer et al. |
| 2006/0184508 A1 | 8/2006 | Fuselier et al. | | 2008/0120183 A1 | 5/2008 | Park |
| 2006/0184579 A1 | 8/2006 | Mills | | 2008/0120308 A1 | 5/2008 | Martinez et al. |
| 2006/0212330 A1 | 9/2006 | Savilampi | | 2008/0120690 A1 | 5/2008 | Norlander et al. |
| 2006/0212401 A1* | 9/2006 | Ameerally et al. ............. 705/51 | | 2008/0133750 A1 | 6/2008 | Grabarnik et al. |
| 2006/0227945 A1 | 10/2006 | Runge et al. | | 2008/0147655 A1 | 6/2008 | Sinha et al. |
| 2006/0235816 A1 | 10/2006 | Yang et al. | | 2008/0147743 A1 | 6/2008 | Taylor et al. |
| 2006/0236257 A1 | 10/2006 | Othmer et al. | | 2008/0148175 A1 | 6/2008 | Naaman et al. |
| 2006/0242139 A1 | 10/2006 | Butterfield et al. | | 2008/0154720 A1 | 6/2008 | Gounares |
| 2006/0242178 A1 | 10/2006 | Butterfield et al. | | 2008/0163284 A1 | 7/2008 | Martinez et al. |
| 2006/0242259 A1 | 10/2006 | Vallath et al. | | 2008/0172632 A1 | 7/2008 | Stambaugh |
| 2006/0258368 A1 | 11/2006 | Granito et al. | | 2008/0177706 A1 | 7/2008 | Yuen |
| 2006/0282455 A1 | 12/2006 | Lee | | 2008/0270579 A1 | 10/2008 | Herz et al. |
| 2007/0013560 A1 | 1/2007 | Casey | | 2008/0285886 A1 | 11/2008 | Allen |
| 2007/0015519 A1 | 1/2007 | Casey | | 2008/0301250 A1 | 12/2008 | Hardy et al. |
| 2007/0043766 A1 | 2/2007 | Nicholas et al. | | 2008/0320001 A1 | 12/2008 | Gaddam |
| 2007/0067104 A1 | 3/2007 | Mays | | 2009/0005987 A1 | 1/2009 | Vengroff et al. |

| | | | |
|---|---|---|---|
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandell et al. | |
| 2009/0249482 A1 | 10/2009 | Sarathy | |
| 2009/0265431 A1 | 10/2009 | Jania et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent...>, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
Nedos, A; Singh K., Clarke S, Proximity Based Group Communications for Mobile Ad Hoc Networks', Proximity-Based Group Communication; Global Smart Spaces; D.14; Oct. 3, 2003; 31 pages.

Brunato, M; Battiti R. "Pilgrim: A Location Broker and Mobility-Aware Recommendation System"; Technical report DIT-02-0092, Universita di Trento, Oct. 2002; 8 pages.

Backstrom et al., Spatial Variation in Search Engine Queries, WWW•2008, Beijing, China (Apr. 21-25, 2008).

Gan et al., Analysis of Geographic Queries in a Search Engine Log, LocWeb 2008, Beijing, China (Apr. 22, 2008).

Jones et al., Geographic Intention and Modification in Web Search, International Journal of Geographical Information Science, vol. 22, No. 3, pp. 1-20 (Jul. 2008).

Go With the Flow, The Economist Technology Quarterly, vol. 382, Issue 8519, 4 pages, (Mar. 10, 2007).

International Search Report and Written Opinion (PCT/US2009/060476) dated May 4, 2010; 12 pages.

International Search Report and Written Opinion (PCT/US2009/060374) dated Apr. 30, 2010; 12 pages.

International Search Report (PCT/US2009/060379) dated Apr. 30, 2010; 3 pages.

International Search Report and Written Opinion (PCT/US2008/085135) dated May 25, 2009; 7 pages.

International Search Report (PCT/US2009/055503) dated Apr. 8, 2010; 3 pages.

Written Opinion (PCT/US2008/085915) dated Jun. 29, 2009; 4 pages.

Written Opinion (PCT/US2008/086948) dated May 21, 2009; 5 pages.

International Search Report and Written Opinion (PCT/US2009/051247) dated Jan. 25, 2010; 9 pages.

International Search Report and Written Opinion (PCT/US2009/046258) dated Dec. 23, 2009; 7 pages.

U.S. Appl. No. 12/273,259, filed Dec. 6, 2007, Davis
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.

Allen James F., "Maintaining Knowledge About Temporal Intervals", Communications of the ACM, Nov. 1983, vol. 26, No. 11 pp. 832-843; 12 pages.

Press Release, "Qualcomm Conducts First Live Demonstration of FL Technology on a Wireless Handset", Qualcomm Inc., San Diego, Sep. 27, 2005; 3 pages.

MediaFlo, FLO Technology Overview, Qualcomm Inc. Copyright 2007; 24 pages.

Axup, Jeff et al., "Conceptualizing New Mobile Devices by Observing Gossip and Social Network Formation Amongst the Extremely Mobile", ITEE Technical Report #459, Dec. 19, 2005, pp. 1-71.

Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).

Davis, Marc et al., "From Context to Content: Leveraging Context to Infer Media Metadata", ACM Press, Oct. 10, 2004, pp. 1-8.

Kaasinen, E., "Behaviour & Information Technology", Taylor & Francis, vol. 24, No. 1, Jan./Feb. 2005, pp. 37-49, (Abstract only attached).

Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).

Lin, F. et al., "A unified framework for managing Web-based services. ", Information Systems and e-Business Management, vol. 3, Oct. 2005, p. 299, (pp. 1-15 of attached).

Metz, Cade, "MySpace Nation", PC Magazine, Jun. 21, 2006, pp. 1-10 attached.

Perkowitz, Mike et al., "Utilizing Online Communities to Facilitate Physical World Interactions", The International Conference on Communities and Technologies, Sep. 19, 2003, Amsterdam, pp. 1 6.

Roush, Wade, "Social Machines", Continuous Computing Blog, Jul. 5, 2005, pp. 1-21.

Roush, Wade, "Social Machines", Technology Review, Aug. 2005, pp. 45-51.

Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).

Voight, Joan et al., "Lessons for Today's Digital Market", ADWEEKCOM, Oct. 2, 2006, pp. 1-6.

"Companies add new communication features to photo sharing.", Digital Imaging Digest, Feb. 2006, pp. 1-2.

"Dave.TV and Eye Music Network Empower Users to Create Their Own Music TV Channel on Their Sites With New IPTV Channel", www.davenw.com/2006, Sep. 13, 2006, pp. 1-2.

"Digital rights management: a primer: developing a user-friendly means of protecting content.(Profile)", Screen Digest, No. 420, p. 305, Sep. 2006, (pp. 1-9 of attached).

"Emerging Markets: What media 2.0 can offer advertisers.", Campaign, Oct. 27, 2006, p. 26, (pp. 1-5 of attached).

"Reality Digital Debuts Opus", www.lightreading.com. Sep. 25, 2006, pp. 1.

"Reality Digital—Making Media Move", www.realitydigital.com, Nov. 28, 2006, pp. 1-2.

Notification of Transmittal of the International Search Report and The Written Opinion of the International Search Authority, or Declaration (PCT/US2007/'084797) dated Mar. 21, 2008; 11 pages.

International Search Report (PCT/US2007/084807) dated May 27, 2008; 3 pages.

International Preliminary Report on Patentability (PCT/US2007/084807) dated May 26, 2009; 5 pages.

International Search Report (PCT/US2010/026063) dated May 27, 2008; 3 pages.

Rekimoto, et al., "CyberCode: designing augmented reality environments with visual tags."Proceedings of DARE 2000 on Designing augmented reality environments, Elsinore, Denmark, pp. 1-11 Apr. 12-14, 2000.

"Semacode—URL Barcodes—practical ubiquitous computing", located at http://semacode.org visited on Apr. 13, 2007; 3 pages.

"Technical White Paper: Choosing the best 2D barcode format for mobile apps, "Semacode, Jul. 15, 2006; pp. 1-7 located at http://semacode.org/about/technical/whitepaper/best2_d_code.pdf.

Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Cooper, M. et al. (Nov. 2-8, 2003). "Temporal Event Clustering for Digital Photo Collections," MM'03 Berkeley, California, pp. 364-373.

Davis, M. et al. (Oct. 10-16, 2004). "From Context to Content: Leveraging Context to Infer Media Metadata," MM'04 New York, New York. 9 pages.

Davis, M. et al. "From Context to Content: Leveraging Context for Mobile Media Metadata." 9 pages.

Davis. M. et al. (Apr. 2-7, 2005). "MMM2: Mobile Media Metadata for Media Sharing," CHI 2005 Portland, Oregon. 4 pages.

Davis, M. et al. "Mobile Media Metadata for Mobile Imaging." Jun. 27-30, 2004; 4 pages.

Davis, M. et al. "Using Context and Similarity for Face and Location Identification."10 pages.

Flickr. "Welcome to Flickr—Photo Sharing," located at <http://www.flickr.com > visited on Feb. 26, 2007, one page.

Gargi, U. (Aug. 7, 2003). "Consumer Media Capture: Time-Based Analysis and Event Clustering," Technical Report HPL-2003-165 HP Laboratories Palo Alto, pp. 1-15.

Goldberger, J. et al. The Hungarian Clustering Method, located at <http://scholar.googles.com/scholar?num=20&h1=en&lr=&9=cache:vbwslsm1CisJ:www.openu . acil/Personal_sites/tarnirtassa/Publications/hcm.pdf+goldberger+clustering+method+hungarian> visited on Mar. 1, 2007, twelve pages.

Graham, A. et al. (Jul. 13-17, 2002). Time as Essence for Photo Browsing Through Personal Digital Libraries, JCDL '02 Portland, Oregon. 11 pages.

Jaffe, A. et al. (May 23-26, 2006). "Generating Summaries for Large Collections of Geo-Referenced Photographs," WWW 2006 Edinburgh, Scotland. 2 pages.

Jaffe, A. et al. (Oct. 26-27, 2006). "Generating Summaries and Visualization for Large Collections of Geo-Referenced Photographs," MIR '06 Santa Barbara, California. 11 pages.

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.

O' Hare, N. et al. "Combination of Content Analysis and Context Features for Digital Photograph Retrieval." 7 pages.

Pigeau, A. et al. (Jun. 17, 2005). "Organizing a Personal Image Collection with Statistical Model-Based ICL Clustering on Spatio-Temporal Camera Phone Meta-Data." 25 pages.

Sarves, R. et al. (Jun. 6-9, 2004). "Metadata Creation System for Mobile Images," MobiSys'04 Boiton, Massachusetts, pp. 36-48.

Toyama, K. et al. (Nov. 2-8, 2003). "Geographic Location Tags on Digital Images," MM '03'Berkeley: California. 12 pages.

U.S. Appl. No. 11/593,668, filed Nov. 6, 2006 for Naaman, et al.

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p...,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about >, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (2007). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

International Preliminary Report on Patentability and Written Opinion of the International Search Authority for PCT/US2009/052638 dated Feb. 22, 2011; 7 pages.

* cited by examiner

SYSTEM AND METHOD FOR CONTEXT ENHANCED MESSAGING

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for delivering media enhanced messages on a network and, more particularly, to systems and methods for messages that include media which relates to a user defined context using, in part, data collected and stored by multiple devices on a network.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is a method. A message from a message sender to be delivered to at least one message recipient is received over a network. The message comprises at least one content criteria. A query is formulated based on the content criteria so as to search, via the network, for user profile data, social network data, spatial data, temporal data and topical data that is available via the network and relates to the content criteria and to media files so as to identify at least one media file that is relevant to the content criteria. The media files are inserted into the message, and the message is transmitted over the network to the recipient.

In another embodiment, the invention is a method. A message from a message sender to be delivered to at least one message recipient is received over a network. The message comprises at least one delivery criteria and at least one content criteria. When it is determined, via the network that the delivery criteria of the message has been satisfied, a query is formulated based on the content criteria so as to search, via the network, for user profile data, social network data, spatial data, temporal data and topical data that is available via the network and relates to the content criteria and to media files so as to identify at least one media file that is relevant to the content criteria. The media files are inserted into the message and the message is transmitted over the network to the recipient.

In another embodiment, the invention is a system comprising: a context enhanced message receiving module that receives messages from senders, wherein the requests each contains at least one recipient, at least one delivery criteria and at least one content criteria; a delivery criteria evaluation and tracking module that determines for each message received by the context enhanced message receiving module if the delivery criteria of the message is satisfied; a media retrieval module that uses content criteria on each message received by the context enhanced message receiving module to formulate a query based on the content criteria so as to search, via the network, for user profile data, social network data, spatial data, temporal data and topical data that is available via the network and relates to the content criteria and to media files so as to identify at least one media file that is relevant to the content criteria; a context enhanced message update module that, for each message, inserts the media files identified by the media retrieval module into the message; and context enhanced message transmission module that transmits each the message updated by the context enhanced message update module to the at least one recipient of the message.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
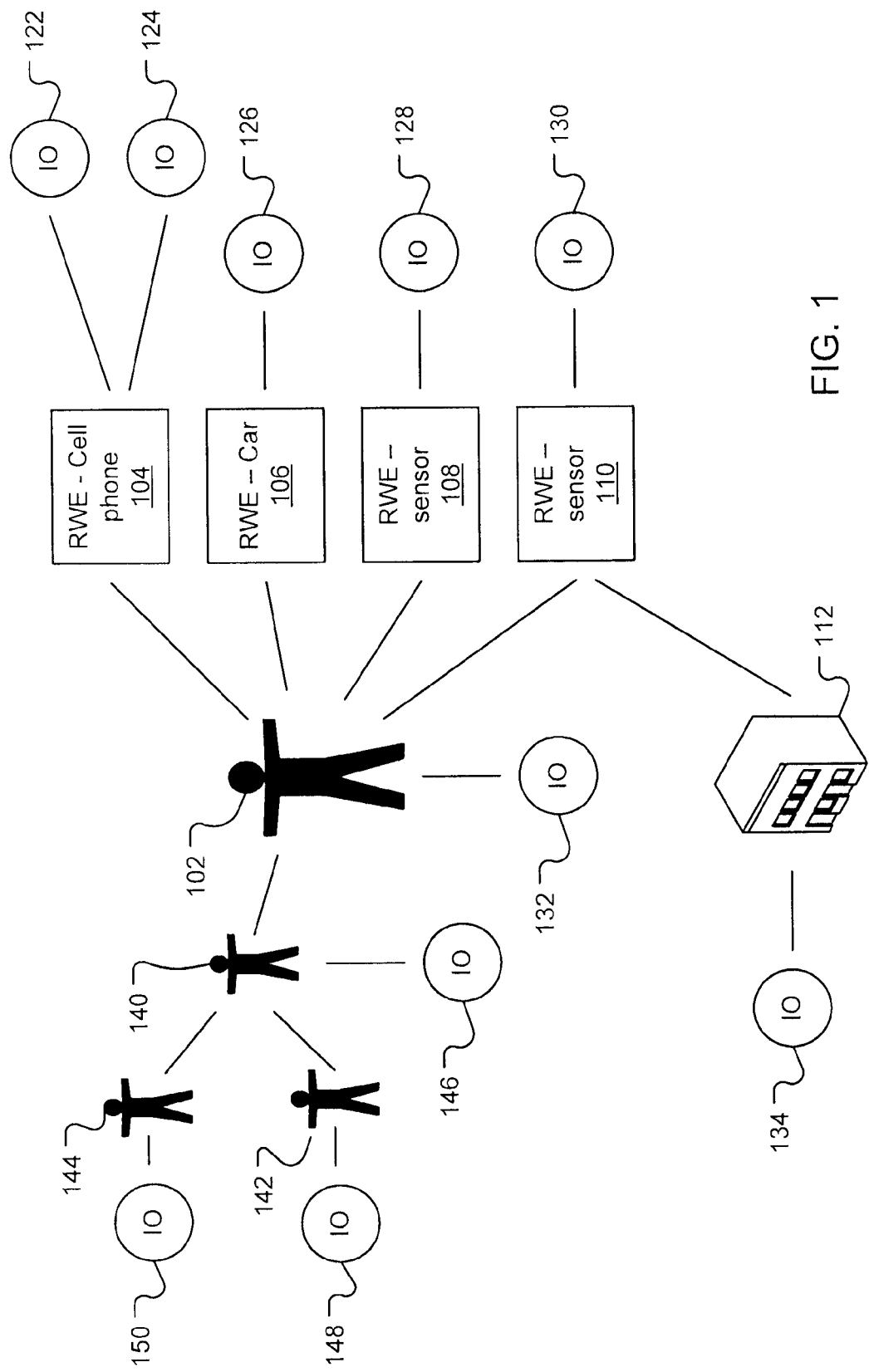
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a genrel purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation).

A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/ significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
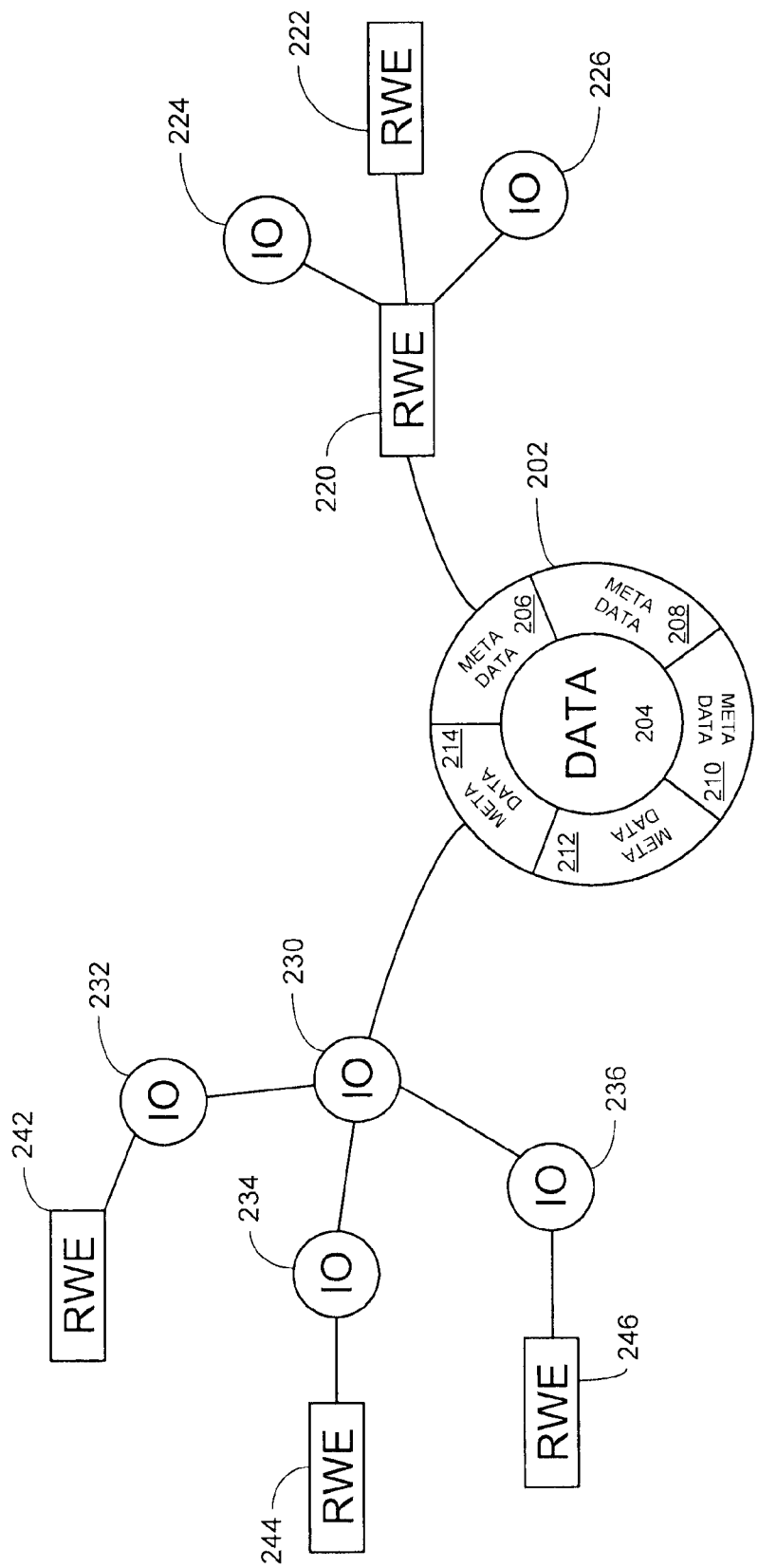
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
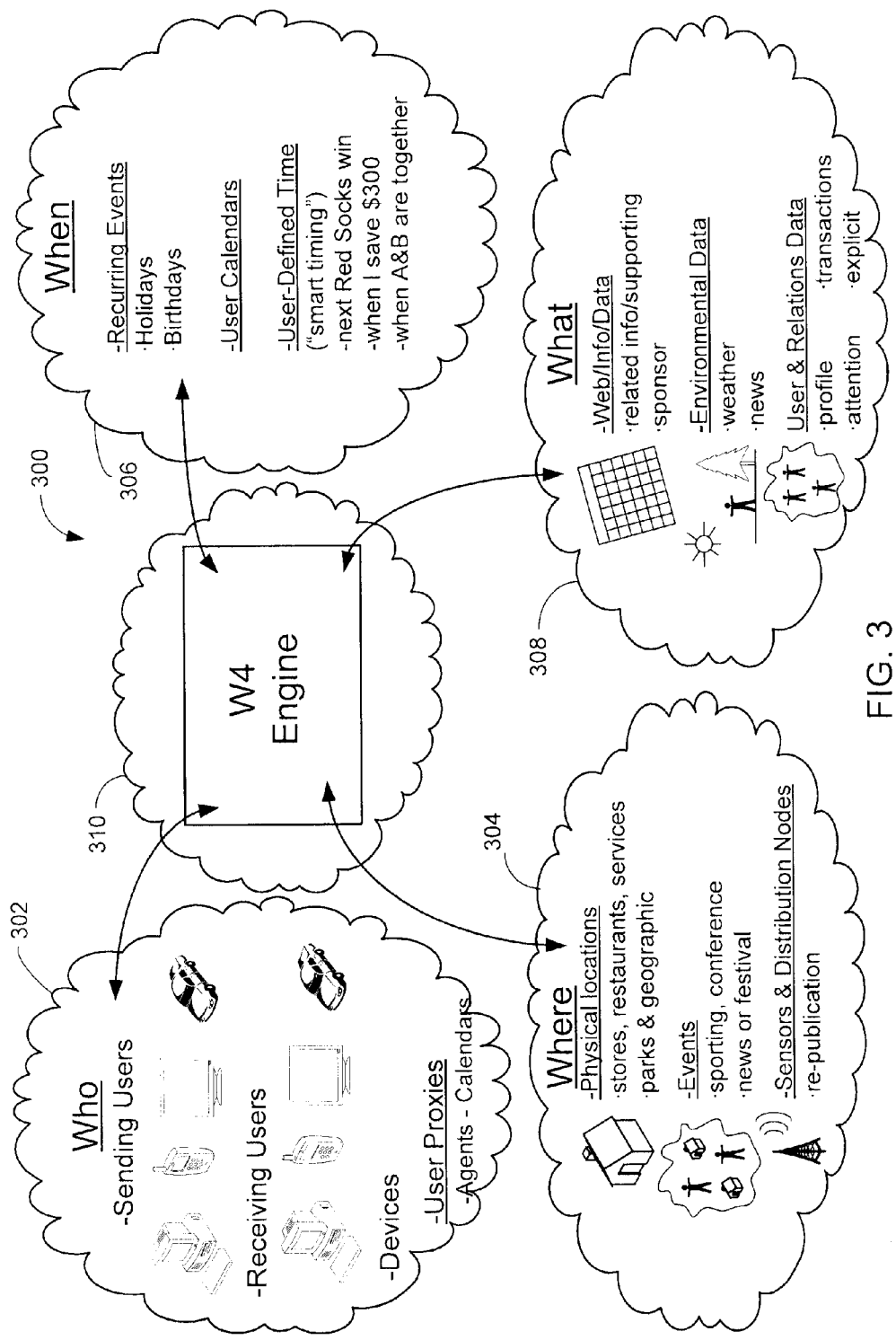
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a genrelpurpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
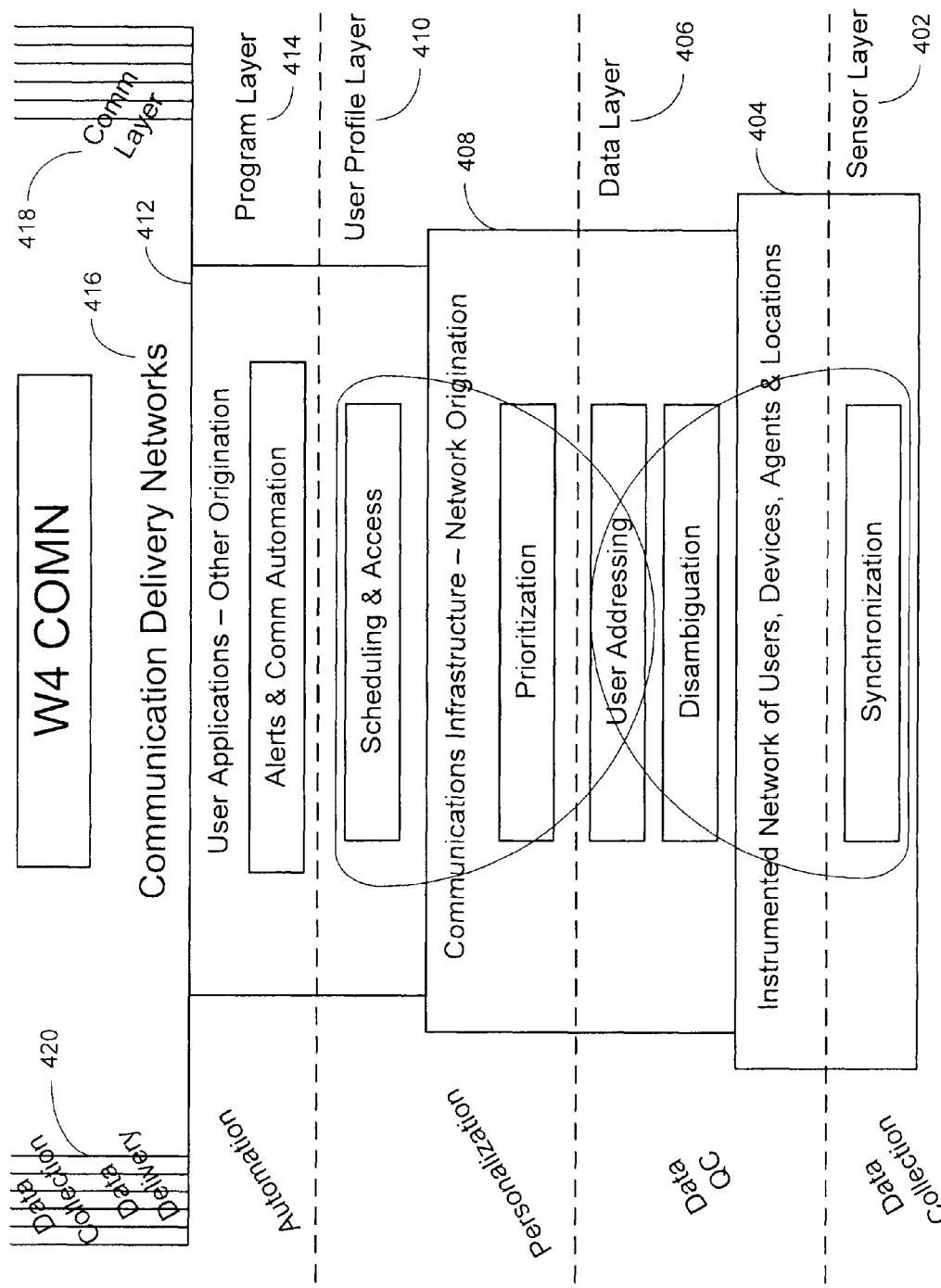
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photoblogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
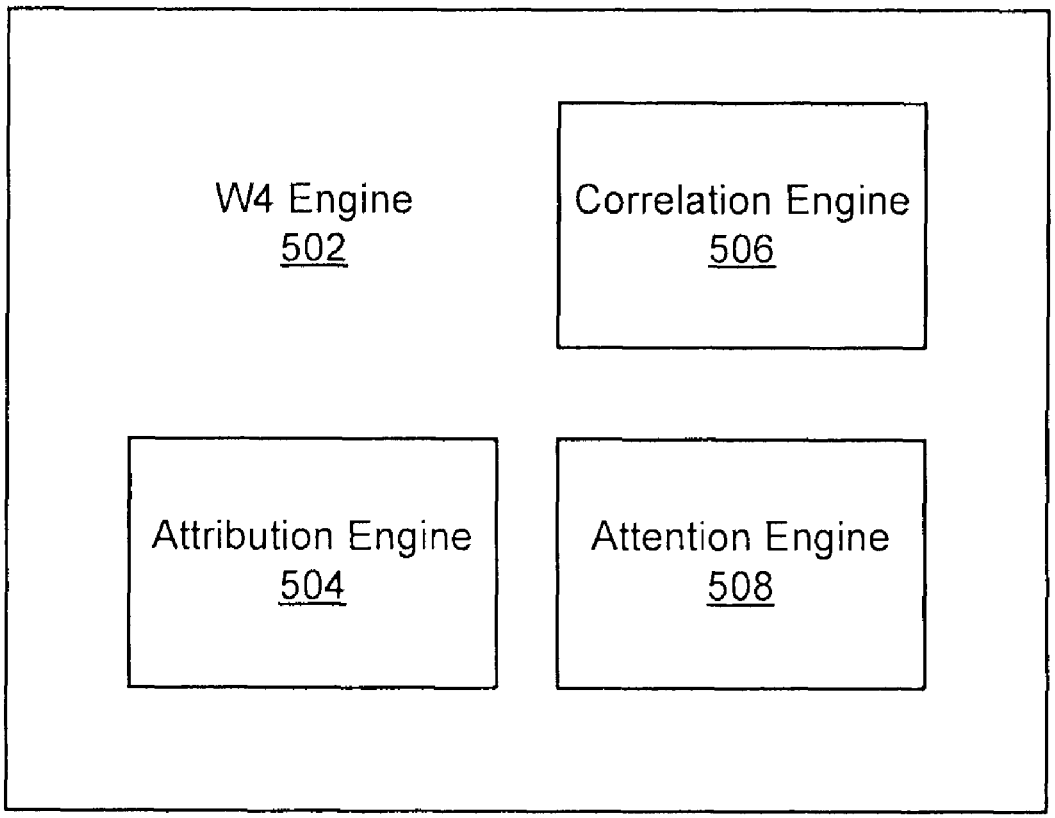
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
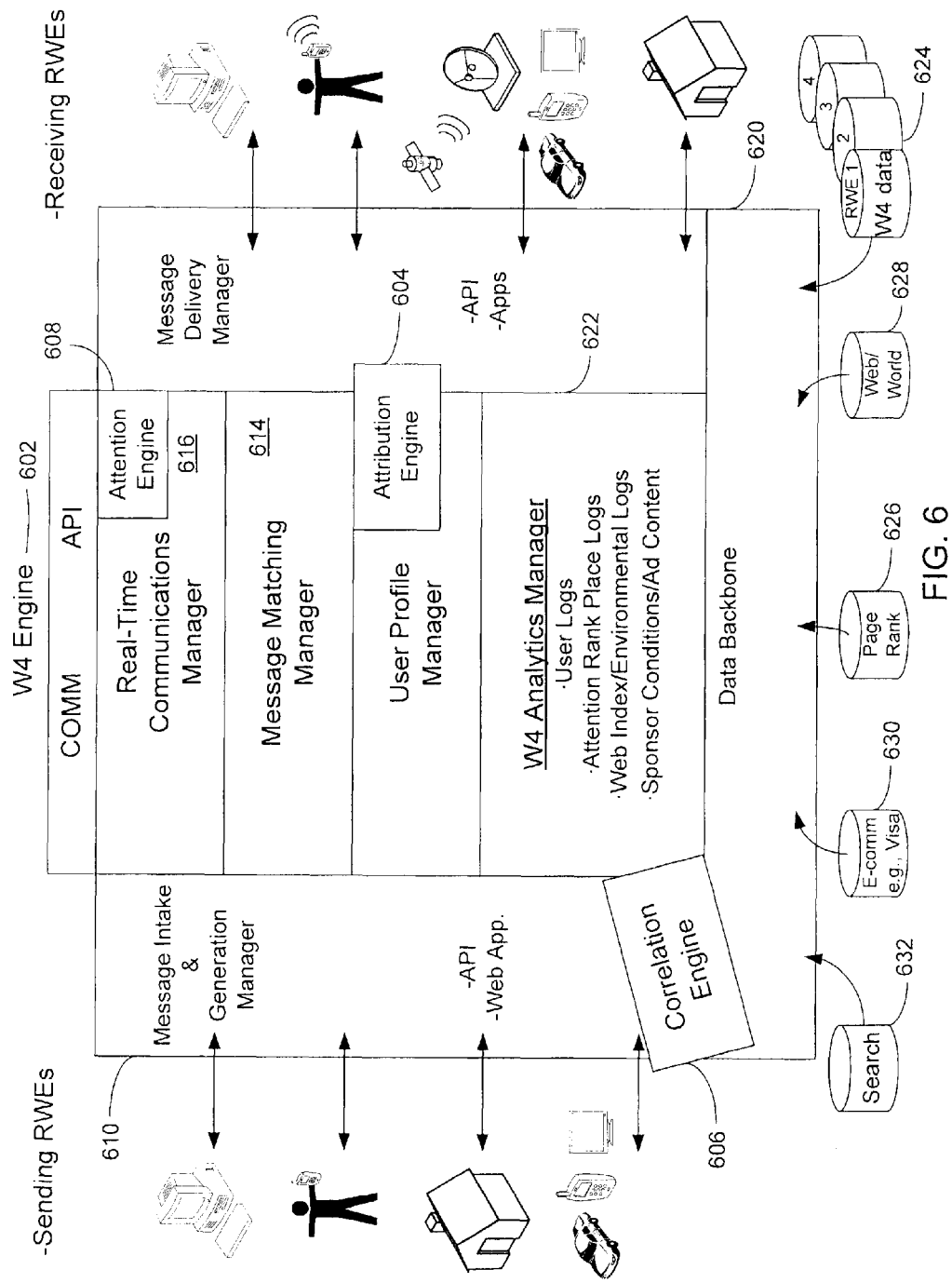
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4 COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

Context Enhanced Messaging

One of the most important functions of many communications and data networks is the ability for users to send messages to one another. Methods of communication include, among others, email, instant messaging, photo messaging, video conferencing and telephonic or cellular voice communications. Such methods of communication are, however, inherently limited. There is often more that a network user wishes to communicate than can be readily expressed in words. Messages can be significantly enhanced by including highly personalized media content such as music and images that are fine tuned to both the sender's message and the recipient's personal preferences.

The right media can evoke deep seated memories in users and create a picture, an impression, a feeling, of a time or place, a person or a group of persons, or even an abstract idea to users that evokes a call to action of some kind, commercial and/or personal. It is simple enough to retrieve a playlist or list of videos for a single musical artist. But a person may wish to capture a more complex concept, for example, a person may wish to create a playlist of songs representing the favorite music of the recipient that relates to a subject, time, place or a mood. Furthermore, messaging can be further enhanced by fine-tuning the delivery of the message to correspond to a specific time or time and date.

When a user creates an enhanced message, the user may be said to have a specific context in mind for the content or delivery of the message. In one embodiment, the message context can be defined as a set of criteria that describe or circumscribe one or more related ideas central to the message, the sender and the recipient in that context, and which can thus be used to create a model of for message content and delivery options for that instance. The criteria can be conceptually divided into four categories: Who, What, When and Where.

"Who" criteria are persons, devices, or proxies who are related to the ideas embodied in the context. "Who" may be a known person, such as the message sender, the message recipients, or a specific person known by the user. "Who" may also be a list of specific persons, such as the contact list stored on the PDA of a user, the guest list of a party, or persons listed on a user's social network profile as friends. Alternatively, "Who" can be a general description of persons of interest, such as persons who are interested in surfing, single women in their 40's who drive motorcycles and like yoga, men who like football and commute by bus, persons who pass by a billboard more than three times a week and/or customers of a specific restaurant who also drive BMWs.

"What" criteria are objects or topics, concrete or abstract that relate to the ideas embodied in the context. "What" may be the form of media the message sender or the message recipients are interested in, such as photos, music or videos. "What" may be an object such as a car, a piece of jewelry or other object of shared interest. "What" may be a genre of music or video, such as country or rock. "What" may be subject matter addressed in media, such as love songs or even specific lyrical phrases. Alternatively, "What" may be a mood or atmosphere, such as happy, sad, energetic, or relaxed. As an indicator of topical relevance, "What" criteria are an unbounded set of things determined by human creation, attention and association or tagging.

"When" criteria are temporal constructs such as dates and times which are related to the ideas embodied in the context. "When" may be the current date and time. "When" may also be a specific date and time in the past or the future, or a range of dates and times in the past or the future, such as a duration, e.g. two hours, four weeks, one year. "When" may be a conditional occurrence if specified conditions or criteria are met. "When" may be an offset from a specific date, for example, ten days in the past, or an offset from a conditional occurrence, ten days after a mortgage payment is late. Alternatively, "When" can be an event on a calendar, such as a birthday, a season or a holiday, or an event of personal or societal/social importance, such as the last time a favorite sports team won a championship.

"Where" criteria are physical locations which are related to the ideas embodied in the context. "Where" may be a user's current location. "Where" may be specific places, such as a country, a state, a city, a neighborhood. "Where" may be defined as the location of an event, such as a concert or some other newsworthy occurrence, or alternatively the personal location of a user when they learned of an event, e.g. where were you when you heard about September 11. Alternatively, "Where" can be a general description of places of interest, such as blues or jazz clubs, or a conditional location depending on the satisfaction or resolution of specified criteria. For example, "where" can be the real-time most popular club for 24-35 year olds, or "where" can be the research lab where breast cancer is finally cured.

In one embodiment, a context-enhanced message comprises four elements: a recipient, a message body, delivery criteria, and content criteria. The recipient is one or more real world entities that are to receive the message. The recipient may be, without limitation, one or more specific persons, may be a group email address, or may be a general description of a type of recipient, such as parents of children on my child's soccer team, or everyone in a person's social network. The recipient may be, or may include, the message sender, such as, for example, a message reminder to one's self.

The message body is a text or media object that expresses a specific message. For example, if a context-enhanced message is an email, the message body will typically contain some kind of text message of arbitrary length such as "Meet me @7:00 PM" or "Happy Birthday." The message body may include an audio file containing, for example, a voice message. The message body may include an image file containing, for example, a picture of the sender, or a video message from the user.

Delivery criteria are the conditions under which the message is to be delivered to the recipients. Such conditions may include "Where" or spatial conditions such as, for example, when a recipient is at a specific location, within a certain proximity of a location, person or object. Such conditions may include "When" or temporal conditions such as a specific time or date or when a specific event occurs. Such criteria may also include "Who" or social criteria, such as, for example, music preferred by one or more of the sender's social network. Such criteria may also utilize "What" or topical criteria, such as, for example, when the recipient's mood as judged, for example, by the content of recent messages sent by the recipient, appears to be sad.

Content criteria describe the media files that are to be included with the message. Such messages may contain criteria keyed to the recipient's or sender's context at the time the message is sent, the context of the subject of the message or the context when the message is to be delivered. Such criteria may include spatial criteria, for example, different media files are included in the message depending on the sender's or recipient's physical location at the time the message is sent or received. Such criteria may include temporal criteria, for example, different media files are included in the message depending on the time of day, the day of the week, or if it is the recipient's birthday. Such criteria may include social criteria, for example, different media files are included in the message depending on the recipient's favorite music. Such criteria may include topical criteria, for example, different media files are included in the message depending on the recipient's mood.

Content criteria may also contain any combination of criteria spatial, temporal, social or topical criteria that are unrelated to the recipient's or sender's context at the time the message is sent or delivered. For example, the message may include a criteria describing the type of media files to be delivered. For example, the criteria may define a playlist for songs in the top 10 in the 1970's whose lyrics reference New York City.

The embodiments of the present invention discussed below illustrate application of the present invention within a W4 COMN. Nevertheless, it is understood that the invention can be implemented using any networked system, virtual or real, integrated or distributed through multiple parties, that is capable of collecting, storing accessing and/or processing user profile data, as well as temporal, spatial, topical and social data relating to users and their devices. Thus, the term W4 COMN is used herein for convenience to describe a system and/or network having the features, functions and/or components described herein throughout.

Figure 7:
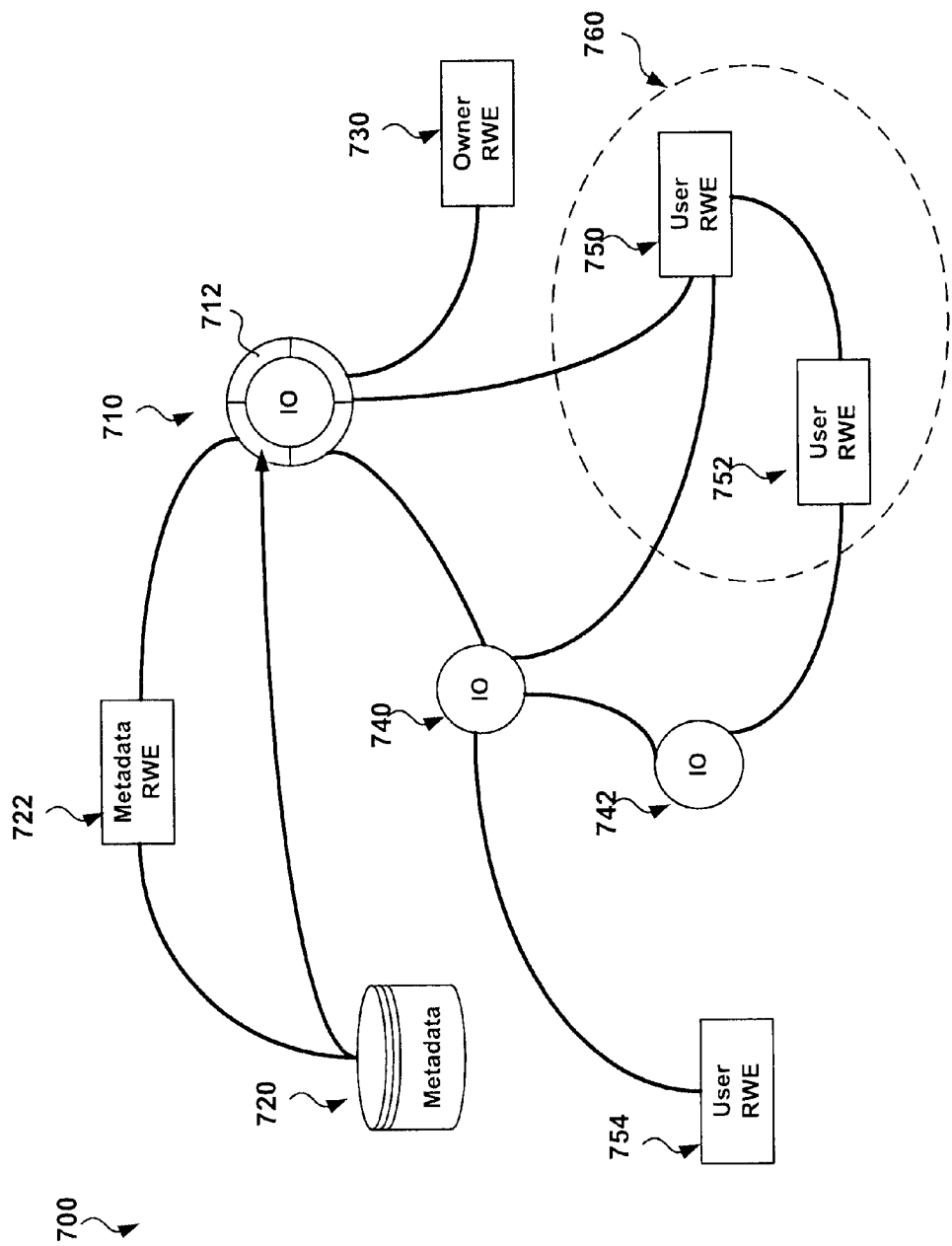
FIG. 7 illustrates one embodiment of a data model showing how a W4 COMN can store media files and relate such files to RWEs, such as persons and places, and IOs, such as topics and other types of metadata.

FIG. 7 illustrates one embodiment of a data model showing how a W4 COMN can store media files and relate such files to RWEs, such as persons and places, and IOs, such as topics and other types of metadata.

In the illustrated embodiment, media is stored as media objects 710. Media objects are passive IOs relating to media files containing audio content, visual content, or both. Such media files can contain content such as songs, videos, pictures, images, audio messages, phone calls, and so forth. The media objects themselves contain metadata 712. Such data may be specific to the to the object data 710 and unrelated to any other IO or RWE. At the simplest level, such metadata may relate to basic file properties such as creation date, text or an image that is associated with a media file to which an IO relates.

Additionally, there are existing databases 720 which can reside within or outside of the network that can provide an extensive set of descriptive metadata relating to specific songs, videos and other types of media. For example, the Allmusic database (formerly the All Music Guide, owned by All Media Guide) provides metadata which includes:

Basic metadata such as names, genres, credits, copyright information, product numbers.

Descriptive content such as styles, tones, moods, themes, nationalities, etc.

Relational content such as similar artists and albums, influences, etc.

Editorial content such as biographies, reviews, rankings, etc.

Other types of databases that can be used as sources for metadata relating to songs and video include:

Historical billboard rankings at a local, regional, or national level, or on foreign billboards.

Music and video industry news.

Music lyrics.

Music blogs or industry data aggregation services

Music consumption transactions and trends data from both online and offline sources In one embodiment, metadata originating from such databases can be extracted from source databases and embedded 712 in the media objects 710 themselves. Alternatively or additionally, the media objects may be related to IOs that contain or relate to metadata 740. Metadata can include one or more keywords or topics that describe or classify data including rating or ranking information for one or more users. For example, an IO relating to metadata can be topics that relate to all songs within a genre, such as rock, or all songs performed at a specific festival, such as Woodstock. Topic IOs relating to metadata can be associated with IOs relating to higher level topics 742. For example, a composer may be associated with a topic such as baroque music, which is itself associated with a higher-level IO for classical music.

Alternatively or additionally, a metadata server with its associated databases can be defined as an RWE 722 within the W4 COMN, and media objects and other IOs can be associated with the RWE 722. In one embodiment, metadata relating to a media object can be retrieved on demand, rather than being stored in static metadata or in a persistent IO. Metadata retrieved on demand can be chosen based on needs of users who have a potential interest in the media object. For example, a user who initially selects a media object based on a topic can then retrieve metadata on demand relating to tone or mood of the music associated with the media object.

If a user wishes to select media objects using a topic for which no topics exists, for example, the top 10 hits in the U.K. in 1975, a metadata server which is capable of providing such information can be queried to retrieve a list of such songs. In one embodiment, the list of songs can be used to create an IO relating to a topic, such as IO 740, by associating media objects relating to the list of songs with a newly created IO. In one embodiment, such an IO is created by a correlation engine within a W4 engine (see above and FIGS. 4 through 6, for example). The IO can then be used in subsequent queries.

In one embodiment, media objects are associated with other RWEs, such as musical rights holders 730 (i.e. owners and licensees), and interested listeners 750. In one embodiment, where an owner 730 of a media object can be identified, an attribution engine within a W4 engine tracks the real-world ownership, control, publishing or other conditional rights of any RWE in any media IO whenever a new object is detected.

In one embodiment, users 750, 752, and 754 can be identified as having an interest in a specific song 710 or a topic IO 740 or 742 by a correlation engine within a W4 engine. In one embodiment, the correlation engine identifies relationships between user RWEs and media or IOs relating to metadata by creating a combined graph of the RWEs and IOs and their attributes, relationships and reputations. For example, a user can explicitly state in a user profile that they have an interest in a specific musical artist. Alternatively, the correlation engine can determine a user's interest in a topic or a song or view based on the content of the user's interaction data, sensing attention events from any internal or external source including transaction history, online path and browsing history as well as physical real-world path and attention data.

In one embodiment, the W4 COMN builds a profile of a user over time by collecting data from the user or from information sources available to the network so as to gain an understanding of where they were born, where they have lived, and where they live today. Using social data, the W4 COMN can also create an overlapping social network profile which places the user in a temporal, geographic and social graph, thus determining where a user lived when and with whom. User RWEs can be also associated with other RWEs through interaction data, co-location data or co-presence data. Users who are interested in the same time/place can declare their interests and be connected to a topic-based social network through, for example, an IO relating to that topic. In the illustrated embodiment in FIG. 7, users 750 and 752 are identified as being within a social network, 760.

Thus, media objects can be stored and associated with temporal, spatial, social network and topical data derived from, without limitation, traditional metadata sources, user profile data, social networks, and interaction data, building a network of relationships across the universe of media and users. Such relationships may be built on demand, if necessary, or alternatively constantly updated based upon real-time receipt of a continuous stream of data related to the user, their proxies, declared and implied interests and the rest of the real and online worlds. Such relationships can then enable queries for media that satisfy the criteria of simple or complex contexts.

Figure 8:
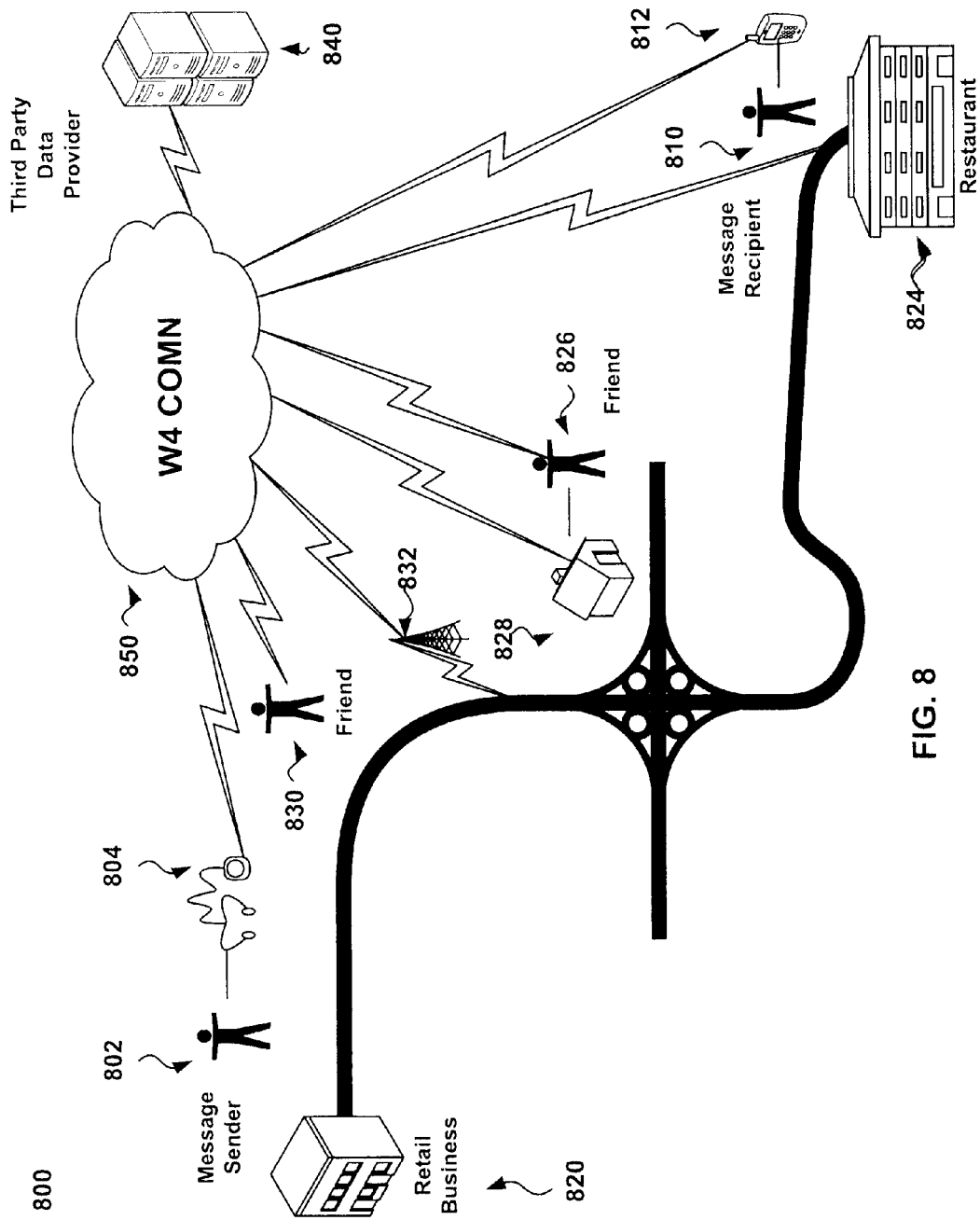
FIG. 8 illustrates one embodiment of a system capable of supporting context-enhanced messaging between users known to a network.

FIG. 8 illustrates one embodiment of a system 800 capable of supporting context-enhanced messaging between users known to a network.

The hub of the system is a W4 COMN 850 or similar network that provides data storage, processing, and real-time tracking capabilities. Within the W4 COMN are servers that provide context-based messaging facilities as will be described in greater detail below. The data relationships described in FIG. 7 above are stored within the W4 COMN. In one embodiment, data relationships between all real world entities and logical data are stored in a global index within the W4 COMN 850 which is maintained by processes within the W4 COMN.

Media objects may be stored by servers within the W4 COMN 850, may be stored in a distributed manner on end user devices, or may be stored by third party data providers 840, or all of the above. Third party data providers 840 may provide additional data to the network 850, such as metadata providers or social networking sites known to the network.

A message sender 802 who wishes to send a context enhanced message to a recipient enters a message with context criteria including delivery criteria and content criteria into a user proxy device 804 which transmits the message to the network 850. The message is processed by servers within the network to add context specified content to the message and the enhanced message is delivered to the message recipient's 810 proxy device 812 under conditions satisfying the delivery criteria.

Real world entities which include the message sender 802, the message recipient 810, the message sender's and message recipient's proxy devices 804 and 812 respectively, the message sender's friends 826 and 830, a retail location 820, a restaurant 824 and a friend's home 828 are known to the network. For each of the entities, the network, without limitation, tracks the physical location of the entity, builds and stores profile data and stores and analyzes interaction data. The network also receives data from remote sensors 832, which can include traffic sensors, GPS devices, weather sensors, video surveillance, cell towers, Bluetooth, Wi-Fi and so forth.

Figure 9:
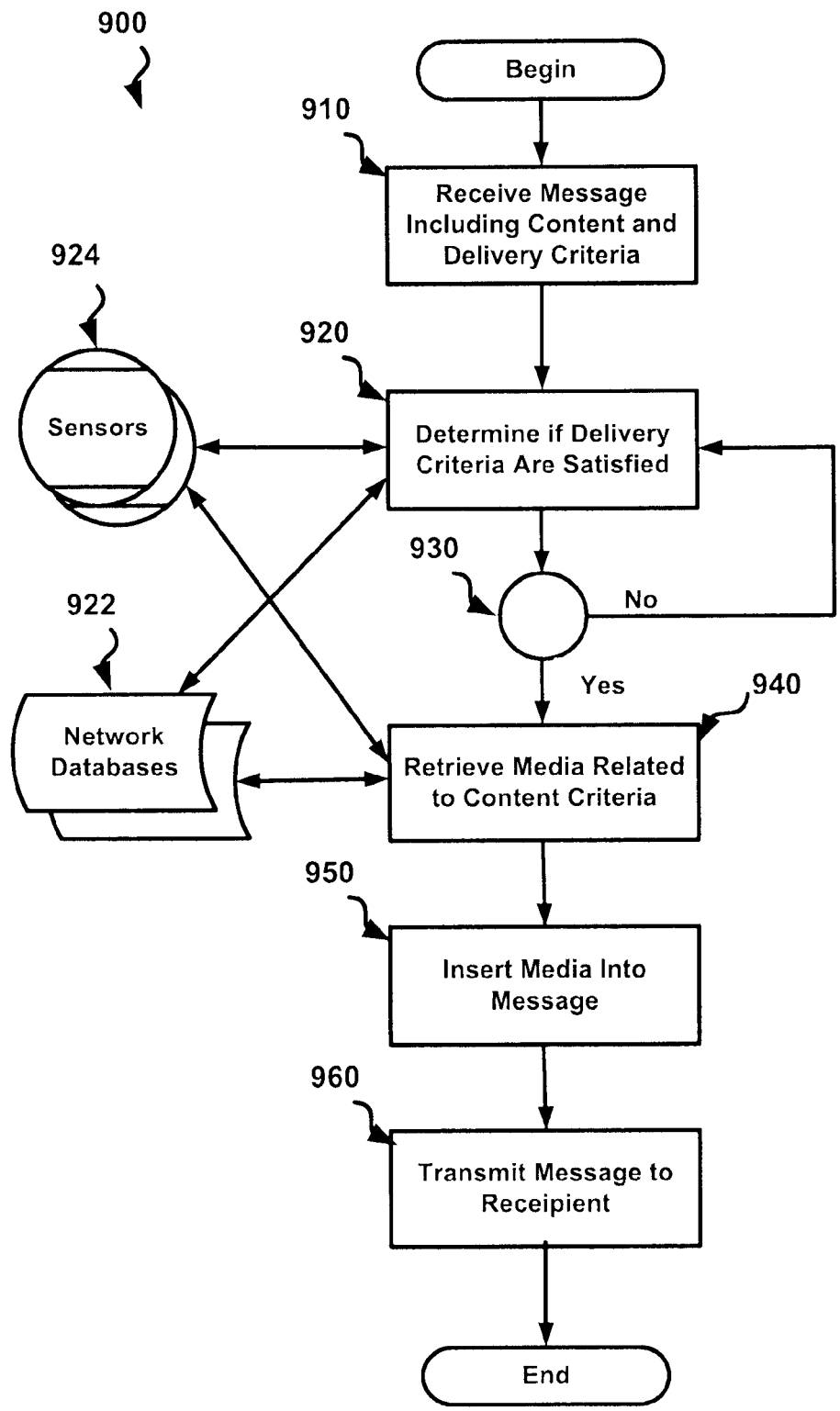
FIG. 9 illustrates one embodiment of a process of how a network containing temporal, spatial, and social network and topical data for a plurality of users, devices, and media, such as a W4 COMN, can be used to enable media enhanced messages having complex user contexts having delivery and content criteria.

FIG. 9 illustrates one embodiment of a process of how a network containing temporal, spatial, and social network and topical data for a plurality of users, devices, and media, such as a W4 COMN, can be used to enable media enhanced messages having complex user contexts having delivery and content criteria.

The process begins when a message is received 910 from a message sender containing at least one recipient, and delivery criteria and content criteria. The message sender may enter the message, delivery and content criteria using any type of proxy device such as, for example, a portable media player, PDA, computer, or cell phone. The delivery criteria and the content criteria can be any combination of spatial, temporal, social or topical criteria.

In one embodiment, the criteria can be related to one another using standard relational or set operators. In one embodiment, the criteria can be stated as a natural language query. In one embodiment, criteria can be ranked in relative importance for each request and prioritized appropriately in the resulting population of enhanced content. The request can be regarded as containing, by default, criteria which specifies the requesting user (i.e. the request is taken from the point of view of the requesting user.) The message need not contain both delivery criteria and content criteria, but may contain only content criteria or only delivery criteria. Multiple recipients may also have multiple divergent or overlapping sets of content and delivery criteria. For example, a requesting user may send a message for a party with instructions for the system to enhance the content of the invitation with each recipients current favorite "party" mood music. Thus, each recipient may receive a different song added to their invitation, and yet each is created by the singular criteria request.

The process then determines if delivery criteria have been satisfied 920 using data available to the network, which includes network databases 922 and sensors 924. Where delivery criteria are not initially met 930, the process retains the message for a fixed length of time and periodically, or continuously reevaluates delivery criteria until delivery conditions are satisfied. The process can monitor any spatial, temporal, social or topical data known to the network using databases 920 and sensors 924 available to the network.

When delivery conditions are satisfied 930, the process retrieves media related to content criteria 940. The criteria are used to search, via the network, for user profile data, social network data, spatial data, temporal data and topical data that is available via the network 922 and 924 and relates to the content criteria and to media files so as to identify at least one media file that is relevant to the content criteria. The media files are then inserted into the message 950 and the message is then transmitted to the message recipient 960. In alternative embodiments, media files related to the content criteria can be retrieved before delivery conditions are evaluated, and the message can be updated and transmitted when delivery conditions are satisfied.

Figure 10:
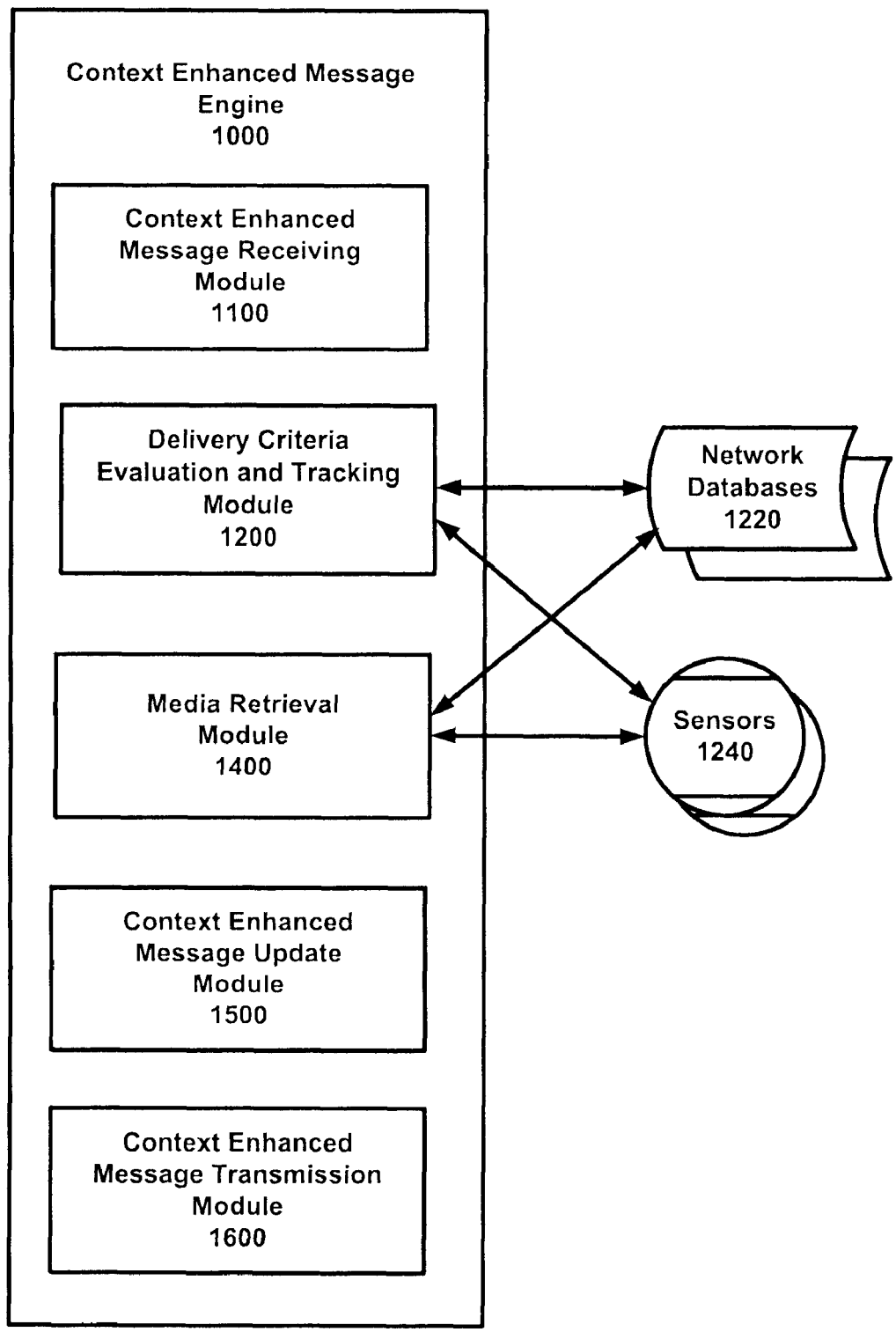
FIG. 10 illustrates one embodiment of a context enhanced message engine capable of supporting the process illustrated in FIG. 9.

FIG. 10 illustrates one embodiment of a context enhanced message engine capable of supporting the process illustrated in FIG. 9.

A context enhanced message engine 1000 resides on a server within the W4 COMN. The context query engine 1000 can be defined to the W4 COMN as an RWE, or alternatively, an active IO. The context query engine can be a component of a W4 engine, or, alternatively, may use services provided by components of a W4 engine or any of its constituent engines.

The context enhanced message engine 1000 includes: a content enhanced message receiving module 1100 that receives messages from message senders containing delivery and content criteria; a delivery criteria evaluation and tracking module 1200 that that determines if delivery criteria are satisfied and tracks data related to delivery criteria; a media retrieval module 1400 that retrieves media related to content criteria; a context enhanced message update module 1500 that inserts media files into messages; and a context enhanced message transmission module 1600 that transmits the updated messages to the intended recipient. Any of the aforementioned modules or the communications between modules (e.g. the delivery or context criteria) can be stored on computer readable media, for transient, temporary or permanent storage.

The coxtent enhanced message receiving module 1100 can provide a user interface for message senders to enter context enhanced message requests. The interface provided may be a graphical user interface displayable on mobile phones, gaming devices, computers or PDAs, including HTTP documents accessible over the Internet. Such interfaces may also take other forms, including text files, such as SMS, emails, and APIs usable by software applications located on computing devices. The interface provides for entry of delivery or content criteria that include spatial, temporal, social, or topical criteria.

In one embodiment, delivery and content criteria can be related to one another using standard relational or set operators. In one embodiment, temporal and spatial data obtained from sensors within user devices can be included in the delivery or content criteria. For example, the current location of a device associated with a user can be automatically identified and included in the criteria, the current time and date, etc. The message sender creating the context can be automatically identified through the association of the proxy device with a user within the network and automatically included in the context.

The delivery criteria evaluation and tracking module 1200 uses all data known to the network to evaluate delivery conditions. Such data may include network databases 1220 and real-time sensors 1240. Sensor data can include data relating to the physical position of any real-world entity and can include the message sender and the message recipient as well as any other known RWEs who may be specified in the delivery conditions. The end user devices may contain positioning or other sensors that detect various aspects of the physical environment surrounding the user, such as, for example, the user's geographical location, altitude and directional vector. Sensors can also include other environmental sensors such as temperature and lighting sensors, or can also include biometric sensors such as heart-rate, brain waves, etc.

The delivery criteria may relate to any combination of spatial, temporal, social or topical data available to the network. In one embodiment, where delivery criteria are not immediately satisfied, the delivery criteria evaluation and tracking module 1200 tracks data related to the delivery criteria in the message. In one embodiment, the delivery criteria are periodically reevaluated. In another embodiment, data relating to delivery conditions are tracked in real-time, and a change in value triggers reevaluation of the delivery conditions.

For example, delivery criteria can specify that the message be processed at a future point in time, periodically, or on the occurrence of a specific event. For example, a delivery may specify that the message be reprocessed on the occurrence of a trigger condition, such as hourly, when the physical location of the entity associated with the delivery condition changes, when a calendared event occurs (e.g. an anniversary), when a news event occurs (e.g. a favorite sports team wins a game), where a spatial, social, temporal or topical intersection occurs (e.g. when two or more friends arrive at favorite bar to watch football) or when the sender's or recipient's mood changes.

The media retrieval module 1400 searches one or more network databases 1220 and sensors 1240, for user profile data, social network data, spatial data, temporal data and topical data that is available via the network and relates to the context and to media files so as to identify at least one media file that is relevant to the content criteria. Such searches are performed using the capabilities of the network databases 1220 and their supporting infrastructure.

In one embodiment, the criteria are interpreted to take advantage of the best available data within the network. For example, if data relevant to the context resides on a relational database, the query module can execute a series of SQL statements for retrieving data from a relational database or a procedural language containing embedded SQL. Queries may be nested or otherwise constructed to retrieve data from one set of entities, and to use the result set to drive additional queries against other entities, or to use recursive data retrieval.

In the case of a W4 COMN, the content criteria can be mapped and represented against all other known entities and data objects in order to create both a micro graph for every entity as well as a global graph that relates all known entities with one another, and media objects relevant to the context are thereby identified. In one embodiment, such relationships between entities and data objects are stored in a global index within the W4 COMN.

Where query criteria relate to simple descriptive matter, such as date and time of creation, relationships can be identified using metadata embedded in media objects. Where criteria relate to a topic, such as a genre of music, relationships can be identified through IOs (whether currently existing or dynamically generated) relating to the topic which may then be used to identify media objects associated with the topic.

Where criteria relate to relationships between two or more IOs or RWEs, such as all friends of a particular user, related IOs and RWEs can be identified using social network relationships supported by the W4 COMN. When a specific media object is selected, the media search module can further determine if the message recipient or the message recipient's proxy receiving the context is permitted to access the content of the media file using ownership data in or associated with the media object.

The context enhanced message update module 1500 can update the context enhanced message in any manner that allows the message recipient to access the selected media files. In one embodiment, the actual media files are inserted into the message and open or begin playing upon opening of the enhanced message by the recipient. In one embodiment, the inserted files comprise links to the media files. In one embodiment, the media files comprise one or more playlists of multiple objects or files. In an alternative implementation, the content criteria are inserted into the message and are not evaluated until the message recipient opens the message. In one such embodiment, media retrieval module 1400 does not process the content criteria until the message recipient opens the message.

The context enhanced message transmission module 1600 can transmit message to a single recipient or a group of recipients having a set of characteristics that define a finite set users known to the network. For example, a message may be sent to users in the sender's social network that are single and like rock music, or to fans of last night's band, who were at the show and also have their own blog.

In one embodiment, an enhanced message can contain an advertisement with enhanced content criteria relating to the advertisement. Thus, an advertisement may supplement basic ad content with media tailored for a specific user. For example, an advertisement for a sports car may be associated with a context specifying the users favorite musical artist and songs with a fast tempo or explicit references to speed, or the year 1975 when the user last owned a sports car.

Context enhanced messages can provide additional data on message senders and recipients to the network. Gathering interaction data contained in context enhanced messages on the preferences and communications patterns between individuals and groups can provide data that can inform advertiser communications to the pair or group or the individuals within that pair or group. For example, a context enhanced message may reveal a user loves butterflies, and an advertiser with butterfly themed merchandise may wish to contact the user.

Specific Examples of Contexts

The disclosure will now discuss specific examples of the above principles. The examples given below are intended to be illustrative, and not limiting.

In one example, if a user wished to send a message containing a song which automatically plays for a recipient at a specified time (e.g. a musical wakeup call.), the message sender could create a message having a delivery criteria of a specific time and a content criteria specifying a specific song. The delivery criteria evaluation and tracking module would track the current time and pass the message on to the media retrieval module for processing when the specified time arrives. The media retrieval module would retrieve the specific song for insertion into the message.

In another example, if a message sender wished to send a message that plays a media object when the recipient reaches a specific location, (e.g. a message that plays a shopping list audio file when the recipient reaches the grocery store), the message sender could create a message having a delivery criteria that specifies delivery when the recipient is in a specific location and a content criteria specifying a specific media object. The delivery criteria evaluation and tracking module would track the recipient's current location and pass the message on to the media retrieval module for processing when the user arrives at the location. The media retrieval module would retrieve the specific media object for insertion into the message.

Alternatively, a message sender may wish to send a message containing a romantic song that plays when the recipient drives past a place that has a romantic meaning to the sender and recipient, such as where they were engaged. The message sender could create a message having delivery criteria that specify delivery when the recipient is in a specific location and a content criteria specifying a romantic song. The delivery criteria evaluation and tracking module would track the recipient's current location and pass the message on to the media retrieval module for processing when the user arrives at the location. The media retrieval module could then search, for example, the recipient's profile data and recent playlists for songs having metadata indicating a romantic or sentimental song.

In another example, a message sender wishes to send a message including an event-based set of tracks to play for the recipient which varies based on actions or locations of the recipient at various times of the day. A message sender could create a message wherein the delivery criteria specify delivery on certain days, such as the recipient's birthday, and content criteria that specify different sets of tracks for breakfast, lunch, and dinner. Content criteria could further specify that the tracks that are played vary with the recipient's location. For example, content criteria could specify one track if the recipient goes to a Thai restaurant for lunch, and another track if the recipient eats at a French restaurant.

In each case, the delivery criteria evaluation and tracking module would track the current date and time, as well as the recipient's current location and pass the message on to the media retrieval module for processing when the delivery criteria are satisfied. The media retrieval module could then search, for example, for media satisfying content criteria, such as, for example, music that relates to food and Thailand or France.

A sender may wish to emote using context enhanced messaging. The message sender could create a message for immediate delivery that specifies content criteria that selects a song reflecting the sender's current mood. The media retrieval module could attempt to determine the sender's current mood by scanning text in their recent emails and text messages. The media retrieval module could then select a song from the sender's favorite songs (e.g. in the user's profile, or most frequent historical play's) that has associations suggesting it is responsive to that mood.

Such a context could define a push or a pull operation. The sender may wish to express his mood to his fiancé with a media enhanced message the system sends on his behalf as described above, or, alternatively, the sender's fiancé may wish to poll his mood. For example, the sender's fiancé could send herself a message that contains content criteria that specifies her fiancé's mood. For example, if he misses her, the system could respond with a song that expresses that emotion in both of them.

In another example, suppose a message sender wishes to send a message incorporating text matching of lyrics of songs in order to express an emotional connection between the sender and the recipient. For example, a sender knows that the recipient loves butterflies. The message sender could create a message for immediate delivery with content criteria specifying a romantic song with lyrics containing the word "butterfly." The media retrieval module could then search, for example, songs whose lyrics includes "butterfly" or "butterflies" and having metadata indicating a romantic or sentimental song and then rank them personally for this specific user based upon their user profile and past consumption data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising the steps of:
transmitting, over a network, a message from a message sender to a message recipient, the message comprising content criteria comprising spatial, temporal, social and topical criteria;
in response to the message recipient opening the message,
formulating a query based on the content criteria so as to search, via the network, for user profile data, social network data, spatial data, temporal data and topical data that is available via the network and relates to the content criteria and to media files so as to identify a plurality of media files that are relevant to the content criteria, such that the search is performed using a global index comprising a global graph that relates entities known to the network with one another, and
providing, over the network, the plurality of media files to the message recipient.

2. The method of claim 1 wherein user profile data comprise data that match a user, and the preferences of the user is used as part of the query.

3. The method of claim 1 wherein the content criteria is the current mood of a person known to the network.

4. The method of claim 1 wherein the content criteria is the lyrics of a song.

5. The method of claim 1 wherein the message comprises at least two content criteria, wherein a first one of the at least two content criteria is used in formulating the query where the message transmitted at a first time, and wherein a second one of the at least two content criteria is used in formulating the query where the message transmitted at a second time.

6. The method of claim 1 wherein the content criteria are ranked in a rank of relative importance and the plurality of media files are prioritized accord to the relative importance.

7. The method of claim 1 wherein at least a portion of the spatial data and temporal data are retrieved from a plurality of sensors known to the network.

8. The method of claim 7 wherein the plurality of sensors comprises a first user device associated with the message sender and a second user device associated with the message recipient.

9. The method of claim 8 wherein the plurality of sensors additionally comprises an environmental sensor that is not associated with a user device.

10. The method of claim 8 wherein the plurality of sensors additionally comprises a biometric sensor.

11. A method comprising the steps of:
receiving, over a network, a message from a message sender to be delivered to a message recipient, the message comprising delivery criteria and content criteria, the content criteria comprising spatial, temporal, social and topical criteria and the delivery criteria comprising spatial, temporal, social and topical criteria;
determining, via the network, that the delivery criteria for the message has been satisfied;
in response to determining the delivery criteria have been satisfied,
formulating a query based on the content criteria so as to search, via the network, for user profile data, social network data, spatial data, temporal data and topical data that is available via the network and relates to the content criteria and to media files so as to identify a media file relevant to the content criteria, such that the search is performed using a global index comprising a global graph that relates entities known to the network with one another, and
determining the message recipient is permitted to access the content of the media file using ownership data associated with the media file;
in response to determining the message recipient is permitted to access the content of the media file,
inserting the media file into the message, and
transmitting the message over the network to the message recipient.

12. The method of claim 11 wherein if delivery criteria is not satisfied when the message is initially received, the message is stored until a change in data on the network causes the delivery criteria to be satisfied.

13. The method of claim 11 wherein the delivery criteria specifies the message is to be transmitted at a specific time.

14. The method of claim 11 wherein the delivery criteria specifies the message is to be transmitted at a specific date and time.

15. The method of claim 11 wherein the delivery criteria specifies the message is to be transmitted on the occurrence of a specific event.

16. The method of claim 11 wherein the delivery criteria specifies the message is to be transmitted when the recipient is in a specific location.

17. The method of claim 11 wherein the delivery criteria specifies the message is to be transmitted when the recipient is in a specific location at a specific time.

18. The method of claim 11 wherein user profile data comprise data that match user, and the preferences of the user is used as part of the query.

19. The method of claim 11 wherein the content criteria is the current mood of a person known to the network.

20. The method of claim 11 wherein the content criteria is the lyrics of a song.

21. The method of claim 11 wherein the message comprises at least two content criteria, wherein a first one of the at least two content criteria is used in formulating the query where the message transmitted at a first time, and wherein a second one of the at least two content criteria is used in formulating the query where the message transmitted at a second time.

22. The method of claim 11 wherein at least a portion of the spatial data and temporal data are retrieved from a plurality of sensors known to the network.

23. The method of claim 22 wherein the plurality of sensors comprises a first user device associated with the message sender and a second user device associated with the message recipient.

24. The method of claim 23 wherein the plurality of sensors additionally comprises an environmental sensor that is not associated with a user device.

25. The method of claim 23 wherein the plurality of sensors additionally comprises a biometric sensor.

26. A non-transitory computer-readable storage medium for tangibly storing thereon computer-readable instructions for a method comprising:
- transmitting, over a network, a message from a message sender to a message recipient, the message comprising content criteria comprising spatial, temporal, social and topical criteria;
- in response to the message recipient opening the message, formulating a query based on the content criteria so as to search, via the network, for user profile data, social network data, spatial data, temporal data and topical data that is available via the network and relates to the content criteria and to media files so as to identify a plurality of media files that are relevant to the content criteria, such that the search is performed using a global index comprising a global graph that relates entities known to the network with one another, and
- providing, over the network, the plurality of media files to the message recipient.

27. The non-transitory computer-readable storage medium of claim 26 wherein user profile data comprise data that match user, and the preferences of the user is used as part of the query.

28. The non-transitory computer-readable storage medium of claim 26 wherein the content criteria is the current mood of a person known to the network.

29. The non-transitory computer-readable storage medium of claim 26 wherein the content criteria is the lyrics of a song.

30. A non-transitory computer-readable storage medium for tangibly storing thereon computer-readable instructions for a method comprising:
- receiving, over a network, a message from a message sender to be delivered to a message recipient, the message comprising delivery criteria and content criteria, the content criteria comprising spatial, temporal, social and topical criteria and the delivery criteria comprising spatial, temporal, social and topical criteria;
- determining, via the network, that the delivery criteria for the message has been satisfied;
- in response to determining the delivery criteria have been satisfied,
  - formulating a query based on the content criteria so as to search, via the network, for user profile data, social network data, spatial data, temporal data and topical data that is available via the network and relates to the content criteria and to media files so as to identify a media file relevant to the content criteria, such that the search is performed using a global index comprising a global graph that relates entities known to the network with one another, and
  - determining the message recipient is permitted to access the content of the media file using ownership data associated with the media object;
- in response to determining the message recipient is permitted to access the content of the media file,
  - inserting the media file into the message, and
  - transmitting the message over the network to the message recipient.

31. The non-transitory computer-readable storage medium of claim 30 wherein if delivery criteria is not satisfied when the message is initially received, the message is stored until a change in data on the network causes the delivery criteria to be satisfied.

32. The non-transitory computer-readable storage medium of claim 30 wherein the delivery criteria specifies the message is to be transmitted at a specific time.

33. The non-transitory computer-readable storage medium of claim 30 wherein the delivery criteria specifies the message is to be transmitted at a specific date and time.

34. The non-transitory computer-readable storage medium of claim 30 wherein the delivery criteria specifies the message is to be transmitted on the occurrence of a specific event.

35. The non-transitory computer-readable storage medium of claim 30 wherein the delivery criteria specifies the message is to be transmitted when the recipient is in a specific location.

36. The non-transitory computer-readable storage medium of claim 30 wherein the delivery criteria specifies the message is to be transmitted when the recipient is in a specific location at a specific time.

37. The non-transitory computer-readable storage medium of claim 30 wherein user profile data comprise data that match a user, and the preferences of the user is used as part of the query.

38. The non-transitory computer-readable storage medium of claim 30 wherein the content criteria is the current mood of a person known to the network.

39. The non-transitory computer-readable storage medium of claim 30 wherein the content criteria is the lyrics of a song.

40. A system comprising:
- a processor;
- a storage medium for tangibly storing thereon program logic for execution by the processor, the program logic comprising:
  - logic executed by the processor for receiving, over a network, a message from a message sender to be delivered to a message recipient, the message comprising delivery criteria and content criteria, the content criteria comprising spatial, temporal, social and topical criteria and the delivery criteria comprising spatial, temporal, social and topical criteria;
  - logic executed by the processor for determining, via the network, that the delivery criteria for the message has been satisfied;
  - logic executed by the processor for, in response to determining the delivery criteria have been satisfied, formulating a query based on the content criteria so as to search, via the network, for user profile data, social network data, spatial data, temporal data and topical data that is available via the network and relates to the content criteria and to media files so as to identify a media file relevant to the content criteria, such that the search is performed using a global index comprising a global graph that relates entities known to the network with one another;

logic executed by the processor for determining the message recipient is permitted to access the content of the media file using ownership data associated with the media file; and logic executed by the processor for, in response to determining the message recipient is permitted to access the content of the media file, inserting the media file into the message, and transmitting the message over the network to the message recipient.

41. The system of claim 40 wherein if the delivery criteria of the message is not satisfied when the message is initially evaluated, the message is retained and the delivery criteria evaluation and tracking logic tracks data related to delivery criteria of the message until the delivery criteria of a message are satisfied.

42. The system of claim 40 wherein the delivery criteria specifies the message is to be transmitted at a specific time.

43. The system of claim 40 wherein the delivery criteria specifies the message is to be transmitted at a specific date and time.

44. The system of claim 40 wherein the delivery criteria specifies the message is to be transmitted on the occurrence of a specific event.

45. The system of claim 40 wherein the delivery criteria specifies the message is to be transmitted when the recipient is in a specific location.

46. The system of claim 40 wherein for the delivery criteria specifies the message is to be transmitted when the recipient is in a specific location at a specific time.

47. The system of claim 40 wherein user profile data comprise data that match a user, and the preferences of the user is used as part of the query.

48. The system of claim 40 wherein the content criteria is the current mood of a person known to the network.

49. The system of claim 40 wherein the content criteria is the lyrics of a song.

* * * * *